United States Patent [19]
Swett

[11] 3,749,001
[45] July 31, 1973

[54] EGG SEPARATOR

[75] Inventor: James B. Swett, Barrington, R.I.

[73] Assignee: Dart Industries, Inc., Los Angeles, Calif.

[22] Filed: Aug. 6, 1969

[21] Appl. No.: 847,849

[52] U.S. Cl. .................................................. 99/499
[51] Int. Cl. ............................................. A47j 43/14
[58] Field of Search .................. 146/2, 2.5; 220/17, 220/19.5, 23.83, 85 H, 94 R, 94 A

[56] References Cited
UNITED STATES PATENTS

| 941,415 | 11/1909 | Heatherington | 146/2 |
|---|---|---|---|
| 1,282,148 | 10/1918 | Tripke | 146/2 |
| 2,720,232 | 10/1955 | Denton | 146/2 |
| 3,058,501 | 10/1962 | Kirkland | 146/2 |
| 2,283,019 | 5/1942 | Serr | 220/94 |
| 2,404,130 | 7/1946 | Frank | 220/94 |
| 3,128,984 | 4/1964 | Palm | 206/19.5 A X |
| 3,219,226 | 11/1965 | Schroeder | 220/23.83 |

Primary Examiner—Willie G. Abercrombie
Attorney—Leigh B. Taylor, Paul R. Wylie and Harold R. Beck

[57] ABSTRACT

An egg separator having a handle reinforced with a downwardly extending flange. The flange is provided with a pair of mutually opposed slots which engage the edge of a bowl or cup permitting the separator to be suspended over the bowl or cup thus freeing the users hands.

3 Claims, 3 Drawing Figures

PATENTED JUL 31 1973

3,749,001

INVENTOR.
JAMES B. SWETT
BY
Leigh B. Taylor
ATTORNEY

EGG SEPARATOR

This invention relates to an EGG SEPARATOR that is adapted to separate the white from the yolk of an egg. More particularly, the invention concerns such a separator that may be easily attached to various sizes of bowls, glasses, etc., without concern about its handle spanning capability.

Prior art egg separators, although quite satisfactory in many respects, generally incorporated only a main separating body portion, a handle and one or more oppositely positioned projecting arms, all of which were integrally connected. These separators lacked rigidity and during use, had to be either held in the hand or suspended across and between the wall of the bowl, etc., which was to receive the egg white. The combined length of the main body, arms and handle therefore was a limiting factor in determining the size bowl, etc., which could be conveniently spanned by such separators. And, of course, the user, if employing a bowl larger than was capable of being spanned, would be further inconvenienced and usually have difficulty as he held the separator and simultaneously introduced the egg into it for separation.

The egg separator of this invention remedies these particular deficiencies with a unique handle construction that incorporates a slotted flange arrangement. Such construction not only adds to the handle rigidity, but also provides a means by which the separator may be suspended from the edge of any bowl, dish, cup, etc., regardless of its overall size. Thus, the user's hands will be freed for attendance to the related tasks.

A main object of this invention, therefore, is to provide an egg separator construction that will enable suspension thereof over various size bowls or the like without increasing the overall length of the separator. Another object is to provide a reinforced separator handle which will rigidify the separator construction.

Additional advantages and objectives will become more apparent upon continued reference to the accompanying detailed specification and drawings wherein:

FIG. 1 is a perspective view illustrating a preferred embodiment of an egg separator adapted for attachment to the edge or rim of a bowl or the like;

Figure 1:
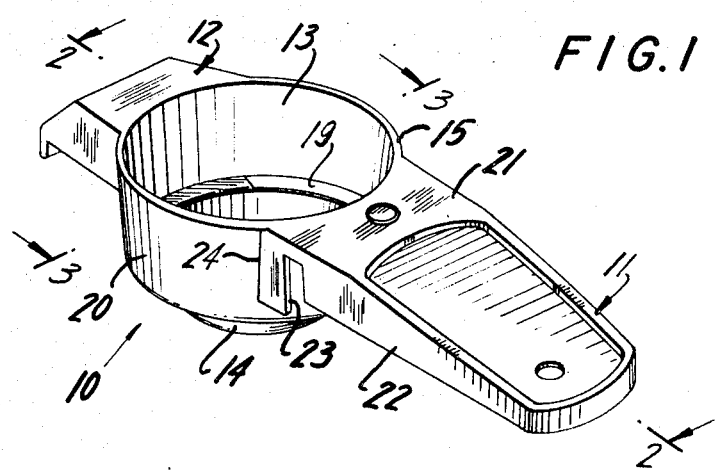

In the preferred embodiment of the invention, as contemplated, the egg separator is comprised of a body 10 formed with an integral handle 11 and a lip portion 12. As may best be seen in FIG. 1, the body 10 in part consists of a substantially annular member or body ring 13 from which the handle 11 and lip 12 project in a substantially opposed relationship.

A shallow annular cup 14 of a diameter slightly smaller than the inner diameter of the body ring 13 is connected to it by means of shoulders or flanges 18. These shoulders (FIG. 2) extend substantially perpendicularly from a ridge 17 that defines the upper periphery of cup 14 and are connected to the bottom rim 16 of the body 13. Note that the shoulders 18 are not continuous but rather are diametrically arranged, thus providing a air of opposite passages 19 (FIG. 3) for the separated whites of an egg to pass downwardly through.

Figure 2:
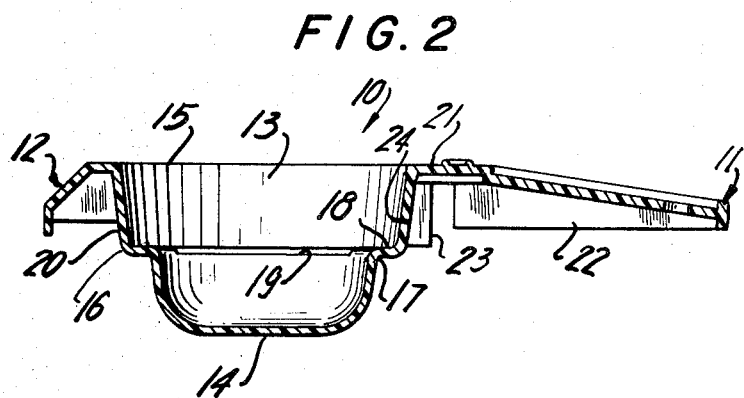
FIG. 2 is a cross-sectional view of the egg separator taken along line 2—2 of FIG. 1; and, FIG. 3 is a cross-sectional view of the separator taken along line 3—3 of FIG. 1.
Figure 3:
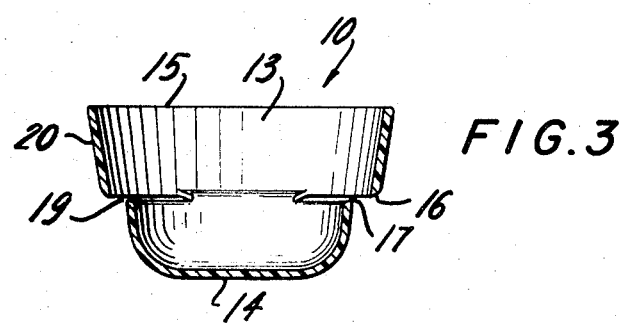

With continued reference to FIGS. 1 and 2, it may be seen that the handle 11 and lip 12 project oppositely from the top rim 15 of body ring 13. These projecting elements extend in an approximately horizontal relationship immediately adjacent the body ring 13 and then are tapered to their terminal points. As is readily apparent, handle 11 extends a substantially greater distance than lip portion 12, however, both are carefully proportioned in accordance with the size of body 10.

Handle 11 includes an upper surface 21, to which is attached a downwardly directed peripheral flange 22. This flange is further attached at its ends 24 to the continuous sidewall 20 of body ring 13. Likewise, there are similarly attached downwardly extending flanges (unnumbered) projecting from the lip portion 12.

The handle flanges 22 are slotted as at 23 in mutually opposed positions equidistant from and proximate to the body ring 13. These flange slots are adaped to fit over the edge or rim of the bowl, etc., into which the egg white is intended to be collected. Thus, it should now be apparent that in instances where the size of the bowl or other collection implement does not enable it to be spanned by the described separator, effective use may be made of the slots 23 to securely attach the separator to the edge of the implement.

In another embodiment, it is possible to modify both positions of attachment of the handle 11 and lip 12 so that they are adjacent to the top rim 15. Further, the particular positioning of flange 22 may be altered as is desired. Similarly, other modifications may be effected without departing from the spirit of the essential characteristics of the invention.

I claim:

1. An egg separator comprising a body having a plurality of passages near its lower portion and a handle connected to said body, said handle having an upper surface and a downwardly extending flange integral with said upper surface, said flange having a pair of mutually opposed slots proximate said body, said pair of slots being of a depth and width which permits said slots to engage the rim of a receiving container so that said pair of slots hold said body over said container without additional support.

2. An egg separator comprising a handle, lip and body said body comprising a body ring having a top and bottom rim, a cup having an upper peripheral ridge and a plurality of shoulders connecting portions of said upper peripheral ridge to said bottom rim, said body having a plurality of passages defined by unconnected portions of the upper peripheral ridge, the bottom rim and the shoulders, said handle being connected to said body and having an upper surface and two mutually opposed downwardly extending peripheral flanges integral with said upper surface, a pair of mutually opposed slots each of said flanges having one of said slots proximate said body, each slot being of a depth and width which permits said slots to engage the rim of a receiving container so that said pair of slots will hold said body over said container without additional support, said lip being connected to said body in opposed relationship to said handle.

3. An egg separator comprising a handle, lip and body said body comprising a body ring having a top and and bottom rim, a cup having an upper peripheral ridge and shoulder connecting portions of said upper peripheral ridge to said bottom rim, such that two passages are defined by unconnected portions of the upper peripheral ridge, the bottom rim and the shoulders, said handle being connected to said body and having an upper surface and a pair of downwardly extending peripheral flanges integral with said upper surface said flanges having a pair of mutually opposed slots substantially equidistant from and proximate to said body, said slots being of a depth and width which permit said slots to engage the rim of a receiving container so that said pair of slots will hold said body over said container without additional support, and said lip being connected to said body in opposed relationship to said handle.

* * * * *